(12) United States Patent
Scalabrino et al.

(10) Patent No.: US 10,545,764 B2
(45) Date of Patent: Jan. 28, 2020

(54) AVAILABLE REGISTER CONTROL FOR REGISTER RENAMING

(71) Applicant: ARM LIMITED, Cambridge (GB)

(72) Inventors: Luca Scalabrino, Villeneuve Loubet (FR); Frederic Jean Denis Arsanto, Le Rouret (FR); Thomas Gilles Tarridec, Juan-les-Pins (FR); Cedric Denis Robert Airaud, Saint Laurent du Var (FR)

(73) Assignee: ARM Limited, Cambridge (GB)

( * ) Notice: Subject to any disclaimer, the term of this patent is extended or adjusted under 35 U.S.C. 154(b) by 296 days.

(21) Appl. No.: 15/082,601

(22) Filed: Mar. 28, 2016

(65) Prior Publication Data
US 2016/0335088 A1    Nov. 17, 2016

(30) Foreign Application Priority Data
May 11, 2015  (GB) .................................. 1507962.7

(51) Int. Cl.
*G06F 9/38* (2018.01)

(52) U.S. Cl.
CPC .................................... *G06F 9/384* (2013.01)

(58) Field of Classification Search
None
See application file for complete search history.

(56) References Cited

U.S. PATENT DOCUMENTS

| | | | | |
|---|---|---|---|---|
| 5,559,988 A | * | 9/1996 | Durante | G06F 3/0601 |
| | | | | 711/100 |
| 6,090,156 A | * | 7/2000 | MacLeod | G06F 8/441 |
| | | | | 717/157 |
| 2003/0065910 A1 | * | 4/2003 | Samra | G06F 9/3836 |
| | | | | 712/217 |
| 2003/0135713 A1 | | 7/2003 | Rychlik et al. | |
| 2004/0133766 A1 | | 7/2004 | Abraham et al. | |
| 2005/0283588 A1 | * | 12/2005 | Yamashita | G06F 9/3808 |
| | | | | 712/217 |
| 2008/0114966 A1 | | 5/2008 | Begon et al. | |
| 2008/0177983 A1 | * | 7/2008 | Piry | G06F 9/30072 |
| | | | | 712/217 |
| 2012/0278596 A1 | | 11/2012 | Tran | |
| 2015/0154022 A1 | * | 6/2015 | Khot | G06F 9/30123 |
| | | | | 712/217 |

(Continued)

OTHER PUBLICATIONS

Moudgill et al. (Register Renaming and Dynamic Speculation: An Alternative Approach, Dec. 1993, pp. 202-213) (Year: 1993).*

(Continued)

*Primary Examiner* — George Giroux
(74) *Attorney, Agent, or Firm* — Nixon & Vanderhye P.C.

(57) ABSTRACT

A data processing apparatus comprises register rename circuitry for mapping architectural register specifiers specified by instructions to physical registers to be accessed in response to the instructions. Available register control circuitry controls which physical registers are available for mapping to an architectural register specifier by the register rename circuitry. For at least one group of two or more physical registers, the available register control circuitry controls availability of the registers based on a group tracking indication indicative of whether there is at least one pending access to any of the physical registers in the group.

18 Claims, 7 Drawing Sheets

(56) References Cited

U.S. PATENT DOCUMENTS

2016/0055833 A1\* 2/2016 Havlir .................. G09G 5/399
 345/536

OTHER PUBLICATIONS

Search Report for GB 1507962.7, dated Oct. 16, 2015, 4 pages.
Monreal et al., "Dynamic Register Renaming Through Virtual-Physical Registers", Journal of Instruction-Level Parallelism, 2000, 20 pages.
Sima, "The Design Space of Register Renaming Techniques in Superscalar Procesors", IEEE Micro, vol. 20, issue 5, Sep. 2000, pp. 70-83.

\* cited by examiner

AVAILABLE REGISTER CONTROL FOR REGISTER RENAMING

BACKGROUND

Technical Field

The present technique relates to the field of data processing. More particularly, it relates to register renaming.

Technical Background

A data processing apparatus may support register renaming in which architectural register specifiers specified by instructions are mapped to physical registers to be accessed in response to the instructions.

SUMMARY

At least some examples may provide a data processing apparatus comprising:

register rename circuitry configured to map architectural register specifiers specified by instructions to physical registers to be accessed in response to the instructions; and available register control circuitry configured to control which physical registers are available for mapping to an architectural register specifier by the register rename circuitry;

wherein for at least one group of two or more physical registers, the available register control circuitry is configured to control whether the physical registers of said group are available in dependence on a group tracking indication indicative of whether there is at least one pending access to any of the physical registers in said group.

At least some examples may provide a data processing apparatus comprising:

means for mapping architectural register specifiers specified by instructions to physical registers to be accessed in response to the instructions; and means for controlling which physical registers are available for mapping to an architectural register specifier by the means for mapping;

wherein for at least one group of two or more physical registers, the means for controlling is configured to control whether the physical registers of said group are available in dependence on a group tracking indication indicative of whether there is at least one pending access to any of the physical registers in said group.

At least some examples may provide a data processing method comprising:

mapping architectural register specifiers specified by instructions to physical registers to be accessed in response to the instructions; and for at least one group of physical registers:

maintaining a group tracking indication indicative of whether there is at least one pending access to any of the physical registers in the group; and controlling, in dependence on said group tracking indication, whether the physical registers of the group are available for mapping to architectural register specifiers in the mapping step.

The above, and other objects, features and advantages will be apparent from the following detailed description of illustrative embodiments which is to be read in connection with the accompanying drawings.

BRIEF DESCRIPTION OF THE DRAWINGS

Further aspects, features and advantages of the present technique will be apparent from the following description of examples, which is to be read in conjunction with the accompanying drawings, in which.

DESCRIPTION OF EXAMPLES

Figure 1:
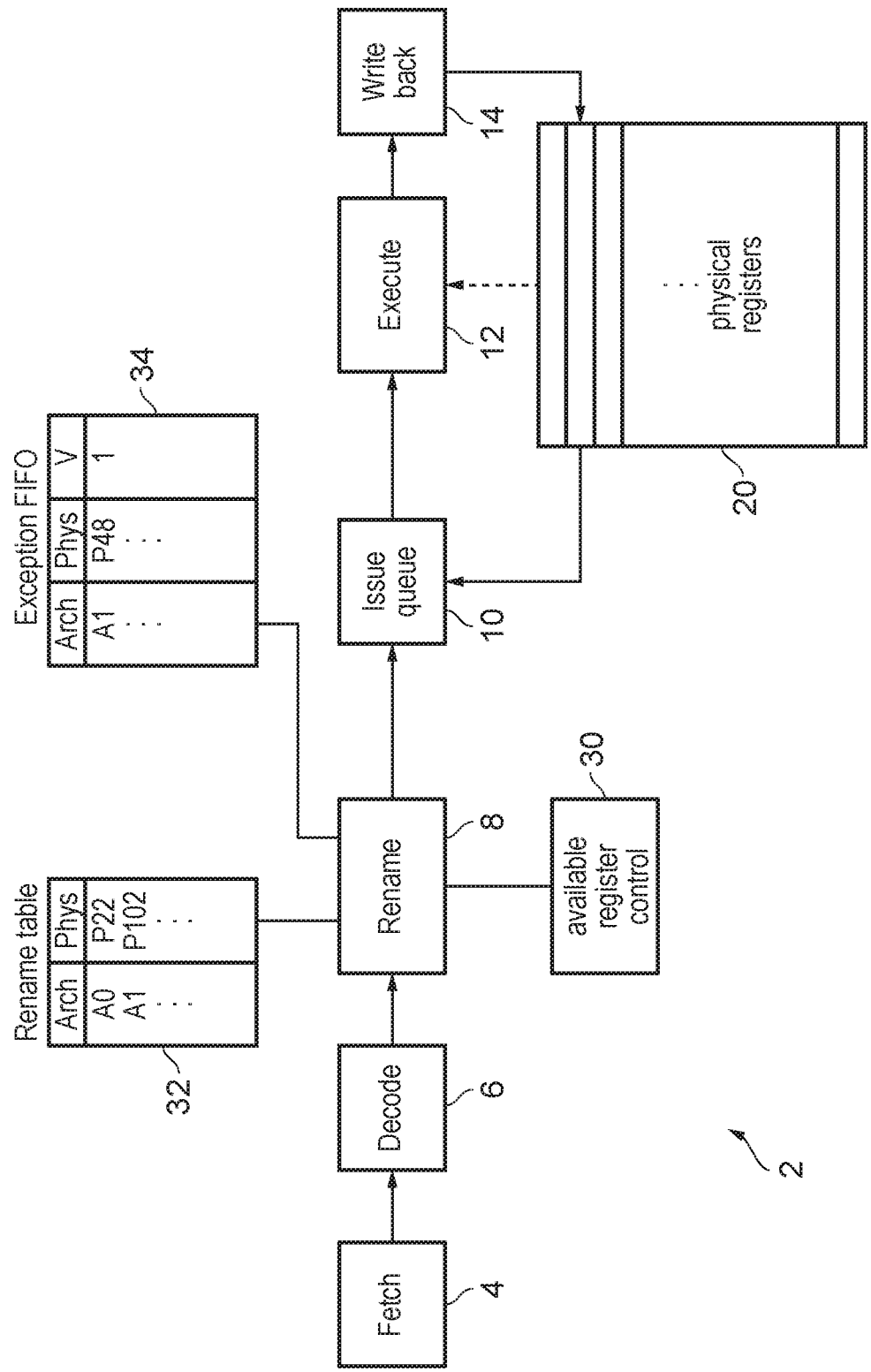
FIG. 1 schematically illustrates a portion of a data processing apparatus comprising register rename circuitry.

Some examples of the present technique will now be described below.

A data processing apparatus may have register renaming circuitry for mapping architectural register specifiers specified by instructions to physical registers to be accessed in response to the instructions. While from a programmer's point of view, the instructions may be able to specify a certain number of architectural register specifiers, the apparatus may actually have a larger number of physical registers. Without register renaming two instructions which write to the same architectural register would have to be executed in order to ensure subsequent instructions use the correct value of the architectural register. However, by using register renaming to map the same architectural register to different physical registers for the two instructions, this can allow the two instructions to be executed in parallel or out of order, which can help to improve performance.

Once a physical register has been mapped to an architectural register specifier, it may be desirable to prevent that physical register being remapped to a different architectural register specifier until instructions which require the current mapping of that physical register have accessed the register, and in some cases for a time after this. Hence, available register control circuitry may be provided to control which physical registers are available for mapping to an architectural register specifier by the register renaming circuitry.

The control of which physical registers are available for renaming can be relatively complex. There may be some overhead associated with the control circuitry for monitoring whether certain physical registers are still required or should be made available for remapping to other architectural register specifiers. A more precise approach may be able to track which allocated physical registers are still required with a higher degree of accuracy to enable physical registers to be reclaimed sooner, which can help to improve performance, but this may be at the cost of additional circuit area and greater leakage in implementing the more precise control logic. On the other hand, a less precise technique may be less costly to implement in terms of circuit area and power consumption (leakage), but if it is more conservative in making allocated physical registers available for renaming again, then this may either require a larger pool of physical registers to maintain a given level of performance, or for a given number of registers may limit performance if physical registers cannot be made available soon enough after renaming and there are not enough physical registers to handle a particular set of instructions. Hence, there is a balance to be achieved between performance and energy efficiency.

There may be various factors which may be considered when determining whether physical registers are made available for mapping to an architectural register specifier by the register renaming circuitry. One example may be whether there are any pending accesses to physical registers. For example, the pending access may be a read operation to read a data value from a physical register in response to an instruction.

One approach may be to detect whether accesses are pending for each individual physical register and to control the availability of that physical register according to whether an access is pending. However, some systems may have a relatively large number of physical registers (e.g. 128 registers) and may support a relatively large number of outstanding register accesses, and so checking whether each register has a pending access can be very expensive in terms of logic, area and power consumption.

Instead, the available register control circuitry may have at least one group tracking indication indicative of whether there is at least one pending access to any of a corresponding group of two or more registers. Hence, accesses to any of the physical registers in the group are tracked with a common group indication, which can be less expensive in terms of circuit area and power consumption than providing individual tracking for each register as it is not necessary to distinguish which particular register in the group has the pending access.

For example, the available register control circuitry may prevent an unavailable physical register becoming available when the group tracking indication for a group of physical registers that includes the unavailable physical register indicates that there is at least one pending access to any of the physical registers in the group. The unavailable register may be prevented from being made available even if the pending access is to a different register in the same group as the unavailable physical register.

It may seem counter intuitive to prevent a physical register becoming available if there is pending access to any register in the same group, as this would seem to limit performance since it may unnecessarily prevent a register being reclaimed even if there is no access pending to that register. However, the inventors found that in practice the grouping of tracking of pending accesses to registers does not in fact limit performance significantly. While the group tracking indication may prevent unavailable registers becoming available if the group tracking indication indicates that there is a pending access to one of the registers in the group, this does not prevent already available registers in the same group being selected for renaming and mapped to a new architectural register specifier by the register rename circuitry. Therefore, in practice, the performance impact would arise only if all the registers in the group become unavailable before the last pending access to any of the registers in the group is complete, which does not happen often in practice. In many cases, the pending read for an allocated register may be completed before another register in the same group is allocated by the rename circuitry, so it can be more efficient to effectively share a single counter between a group of registers, no that the additional overhead of counting pending accesses to each register may not be justified.

There may be various ways of tracking the pending accesses to the registers in the group. One possibility may be to provide a tracking value which takes a first value if there is a pending access to any register in the corresponding group, and a second value if there is no pending access. In this case, the tracking indication may simply indicate a binary yes/no indication of whether there is at least one pending access to the corresponding group of registers, and need not distinguish how many accesses are pending other than whether there is at least one pending access.

However, other examples may provide a group counter for counting a total number of pending accesses to any of the physical registers in the group. This approach may be more efficient to implement in practice since it may not require decoding circuitry for decoding the register specifier specified by every pending access.

For example, the group tracking indication may track the register accesses pending in a certain part of a processing pipeline. In some cases the apparatus may include a register reading unit at which read accesses to registers take place for at least some instructions. A group counter may be provided which indicates the number of references to any of the physical registers in the corresponding group of registers by pending instructions in the register reading unit. When the group counter indicates that there is a pending instruction in the register reading unit which references one of the registers in the group, then the available register control circuitry may prevent that group of registers becoming available for renaming. For example, in some systems data values may be read from registers while instructions are pending within an issue queue for queuing instructions awaiting execution. In this case, the register reading unit may be the issue queue. In other systems, the register reads may not take place until an execute stage of the pipeline, and so the register reading unit may be an execute unit for executing instructions.

One approach for tracking the number of outstanding accesses may be to decode references to physical registers within each instruction pending within the register reading unit. However, in practice the register reading unit may support a relatively large number of pending instructions and each instructions may refer to multiple registers, and so this could result in a relatively large amount of decoding logic, which can increase circuit area and power consumption.

Where the group tracking indication is a group counter, a more efficient approach can be to detect references to physical registers by pending instructions entering or leaving the register reading unit, which may require fewer register references to be decoded per cycle. For example, when an instruction referencing any register of a given group is provided to the register reading unit, the corresponding group counter for that group may be incremented. When an instruction referencing one of the group of physical registers is removed from the register reading unit or completes processing in the register reading unit, then the corresponding group counter may be decremented. An instruction may be removed from the register reading unit either because it successfully completes processing in the register reading unit, or because the instruction has been cancelled (for example, due to a branch misprediction, load misspeculation, load/store abort or other event which means that the instruction should not be executed). Some instructions may specify multiple registers and so may cause several group counters to be incremented or decremented when the instruction is provided to, or removed from, the register reading unit. The group counter may be initialised at a predetermined value when there are no pending instructions in the register reading unit which require one of the corresponding group of physical registers. For example the predetermined value may be zero (although other values could also be used). The available register control circuitry may prevent an unavailable physical register becoming available for remapping to a different architectural register specifier when the group counter for a group of physical registers including that unavailable physical register has any value other than the predetermined value.

The terms "increment" and "decrement" are used herein to refer to an adjustment of the group count value by a predetermined amount, with one of the "increment" and "decrement" corresponding to adding the predetermined amount to the count value and the other of "increment" and "decrement" corresponding to subtracting the predetermined amount from the count value. Often, the predetermined amount may be 1, "incrementing" may correspond to adding 1 to the count value, and "decrementing" may correspond to subtracting 1 from the count value. However, other values could be used as the predetermined amount, or in some cases the counter may start at a higher value with "incrementing" corresponding to a subtraction and "decrementing" to an addition.

In another example, the register reading unit may have a number of slots for storing indications of pending register reads, and the group tracking indication could be an indication of which slots hold pending register reads specifying a register from the corresponding group. An unavailable register could then be prevented from becoming available for renaming when the group tracking indication indicates that there is at least one slot of the register reading unit which stores an indication of a pending register read to any of the physical registers in the corresponding group.

The number of registers in each group can be selected to balance performance against circuit area or energy efficiency. Larger or smaller groups can be selected depending on the needs of a particular implementation.

At one extreme the group of registers may comprise all of the physical registers, so that only one group of registers is provided and a single group tracking indication tracks pending accesses to any of the registers in the group. In this case, release of a previously allocated physical register may be prevented if there is a pending access to any physical register at all. This may seem counter intuitive, but as mentioned above this may still permit available physical registers to be allocated, and it is only once all the registers have become unavailable that releasing the registers would be prevented by the group tracking indication if there are any pending accesses outstanding, which may not happen often if it takes some time to allocate all the registers. An occasional stall to clear a backlog of uncompleted register accesses before starting to reallocate registers again may be justified in some implementations given that this approach has the smallest area and leakage overhead associated with the group tracking indication and associated logic.

In other embodiments, however, there may be two or more groups of registers with each group having a corresponding group tracking indication and the available register control circuitry controlling whether the physical registers of the group are available in dependence on the corresponding group counter.

For example, with the group counter example, if there are Z physical registers and each group comprises G physical registers, where $2 \leq G \leq Z$, and the register reading unit is capable of handling up to M pending register reads, then Z/G group counters may be provided and each group counter may have at least N bits, where N is the smallest integer greater than or equal to $\log_2(M \times G+1)$. An N-bit counter is sufficient to count pending register reads to the group of physical registers, even if every pending register read in the register reading unit specifies a register in the same group. In contrast, if each register had an individual counter then this would require Z counters of $\log_2(M+1)$ bits or more, which would require more power hungry circuitry, not just in having more counters, but also in having more complex logic for decoding register specifiers within instructions and mapping these to corresponding control signals for incrementing or decrementing the counters.

One advantage of tracking accesses to registers in groups is that fewer bits of register specifiers may need to be considered when updating the at least one group tracking indication to update. For example, if physical registers are identified using R-bit register specifiers, where R is an integer, the available register control circuitry may select which group tracking indication is to be updated in response to detecting a particular register reference based on fewer than R bits of the register specifier. This can reduce the amount of decoding circuitry required for decoding the register specifiers and updating the group tracking indication. For example, if registers are grouped in groups of 8, then it may not be necessary to consider the least significant 3 bits of the register specifiers.

The available register control circuitry may consider other factors in addition to whether there are any pending accesses to groups of physical registers, when determining which registers are available for selection by the register rename circuitry. Therefore, the group tracking indication may not be the only information considered when determining whether registers can be made available for renaming. Hence, while a register may be prevented from being made available if the corresponding group tracking indication indicates that there is a pending access to a register in the corresponding group, the converse is not necessarily true—even if the group tracking indication indicates that there are no pending accesses to the corresponding group of registers this does not necessarily mean that the register can be made available. There may be other reasons for reserving registers to protect them from reallocation.

For example, in addition to the group tracking indication(s), any of the following parameters could also be considered when determining whether a register can be made available for renaming:

an indication of whether the physical register is currently mapped to an architectural register specifier;

If a physical register is currently mapped to an architectural register specifier; the data value stored in the physical register represents the current architectural state, which could be lost if a subsequent instruction was allowed to write to the same register. This can be prevented by indicating the physical registers currently mapped to architectural register specifiers as unavailable for renaming.

an indication of whether there is an uncompleted write to the physical register; By preventing a physical register becoming available for renaming until after any pending write to that register is complete, this can protect against write-after-write (WAW) hazards where two write operations complete in the wrong order which could cause other instructions to access the wrong value, an indication of whether there is an unresolved speculative instruction which specifies an architectural register specifier which was previously mapped to the physical register.

Some systems may support speculative execution of some instructions. For example, the outcome of a branch may be predicted using a branch predictor and some instructions may be executed speculatively following the branch depending on whether the branch is predicted taken or not taken. Other speculative instructions may include load/store instructions which may be executed speculatively assuming that there is no abort due to insufficient access permissions for example. An instruction may also be considered speculative if it follows another speculative instruction. If the speculation for a given instruction turns out to be correct, performance is improved since the delay in determining whether the instruction should have executed or not has not delayed the actual execution of the instruction. However, if it is determined that the speculation is wrong and the instruction should not have executed or a result of the instruction is incorrect, then the execution of the instruction may be cancelled and it may be required to restore previous register state. Therefore, when generating a new register mapping for an architectural register specified by a speculative instruction, an indication of the physical register which was previously mapped to the same architectural register may be retained and this physical register may be made unavailable for selection by the register rename circuitry so that the data value within that physical register can be used to restore the previous register state if the speculative instruction has to be cancelled.

In some cases an availability register may be provided which includes a number of bits with each bit indicating whether a corresponding physical register is available or unavailable. The group tracking indication(s) and the parameters described above may be used to control whether a bit in the availability register for a given physical register may be changed from a first value indicating that the register is unavailable to a second value indicating that the register is available. Hence, a bit of the availability register may be changed to the second value if the group tracking indication for the group including the corresponding register indicates that there are no pending accesses to any registers in the group, and if the other parameters also indicate that there is no other reason for reserving the physical register. The register rename circuitry may, when selecting a physical register to map to an architectural register, select one of the registers for which the corresponding bit in the availability register has the second value.

FIG. 1 schematically illustrates a portion of a processing pipeline in a data processing apparatus 2. The pipeline includes a number of stages including a fetch stage 4, a decode stage 6, a rename stage 8, an issue stage 10, an execute stage 12 and a write back stage 14. Instructions to be processed move from stage to stage, and one instruction may be pending at one stage of the pipeline while another instruction is pending at a different stage. It will be appreciated that this is just one example of a possible pipeline and other examples may have other stages or arrangements.

The fetch stage 4 fetches program instructions from an instruction cache or memory. The decode stage 6 decodes the fetched instructions to generate decoded instructions which are passed to the rest of the pipeline for processing. For some instructions, a single instruction fetched from memory may be decoded into a single decoded instruction passed down the pipeline. However, for other more complex instructions, a single fetched instruction may be decoded into multiple decoded instructions known as "micro-operations". For example, an instruction for triggering a series of operations to be performed (such as a load multiple instruction) may be decoded into individual micro-operations each corresponding to one of the operations. Therefore, the "instructions" as seen by the later stages 8, 10, 12, 14 of the pipeline may be different from the instructions fetched from memory and the term "instruction" should be interpreted as encompassing a micro-operation.

The apparatus 2 has a number of physical registers 20 available for storing data values. A register renaming stage 8 performs register renaming for the decoded instructions (or micro operations) to map architectural register specifiers specified by the instructions to physical register specifiers identifying one of the physical registers 20. The instruction set architecture may support a certain number of architectural registers which are visible to the programmer. For example, a 4- or 5-bit register field in the instruction encoding may specify one of 16 or 32 different architectural register specifiers. However, to allow hazards between instructions specifying the same architectural register specifier to be resolved or to permit out of order or parallel processing of instructions, a greater number of physical registers may be provided, and the register rename stage 8 may map the architectural register specifiers in the decoded instructions to corresponding physical registers.

The renamed instructions now specifying physical register specifiers are passed to the issue queue 10 where they are queued while awaiting execution. Instructions remain in the issue queue until their operands are available, at which point the instruction is issued to the execute stage 12 for execution. Instructions may be issued for execution in a different order to the original program order in which they were fetched by the fetch stage 4. For example, while one instruction is stalled because its operands are not yet available, a later instruction whose operands are available may be issued first.

The execute stage 12 may include various processing units for executing processing operations in response to instructions. For example, the processing units may include an arithmetic/logic unit (ALU) for performing arithmetic or logical operations, a load/store unit to perform load operations for loading a data value from memory and placing it in a physical register or store operations for storing to memory a data value currently stored in a physical register, a vector processing unit for performing vector operations on data values comprising multiple data elements, floating-point circuitry for performing operations on floating-point values, or any other type of processing circuitry. In some cases the execute stage 12 may include a number of parallel execute pipelines for processing different kinds of instructions.

When execution of the instruction is complete in the execute stage 12, the instruction is passed to the write back stage 14, which writes a result of the instruction to a physical register 20.

In the example shown in FIG. 1, for renamed instructions which specify one or more physical registers from which data values are to be read, the reading of the physical register takes place while the instruction is pending in the issue queue 10. However, other embodiments may read the physical registers 20 at the execute stage 12 instead, as shown by the dotted line in FIG. 1.

Available register control circuitry 30 is provided for controlling which of the physical registers can be selected by the rename stage 8 for mapping to an architectural register specifier. The available register control logic 30 will be described in more detail below but in general the available register control circuitry 30 may provide the rename stage 8 with an indication of which physical registers are available or unavailable for selection. When an instruction which writes to a register is received from the decode stage 6, the rename stage 8 generates a new register mapping for the architectural register specified as the destination register for the instruction. The rename stage 8 selects a physical register which is indicated as available by the available register control circuitry 30 and updates a rename table 32 to include a rename entry mapping the destination architectural specifier to the selected physical register.

The pipeline 2 supports speculative execution of instructions. Some instructions may be executed speculatively before it is known whether the instruction should be executed, or before it is certain that the result of the instruction will be valid. For example, following a branch instruction, some instructions may be executed speculatively based on a prediction of whether the branch is taken or not taken, before the actual branch outcome is known. When the speculation is correct, speculative execution can improve performance by eliminating a delay which would arise if the instruction was not executed until after it is known that the instruction should have executed or that its result will be valid. However, if the speculation turns out to be incorrect, then execution of the instruction may need to be cancelled and architectural state may need to be restored to the last valid state.

An exception memory 34 is provided for tracking previous register state which can be restored in the event of a misspeculation. When a new register mapping is generated by the rename stage 8 for a given architectural register specifier, the previous mapping is written to the exception memory 34. For instance, in the example of FIG. 1, when a new mapping of architectural register A1 to physical register P102 is generated in the rename table 32, the physical register P48 which was previously mapped to architectural register A1 is written to the exception FIFO. The previous physical register P48 continues to store the data value which was associated with architectural register A1 at the point just before execution of the instruction. Hence, if there is a misspeculation for the instruction specifying architectural register A1, then the current mapping for architectural register A1 in the rename table 32 is updated based on the corresponding mapping in the exception memory 34, so that architectural register A1 now maps to physical register P48 again. It is not necessary to transfer data between registers in order to restore the architectural state, since simply updating the register mapping in the rename table 32 is enough to cause subsequent instructions which read architectural register A1 to access the previous data in the restored physical register P48.

Figure 2:
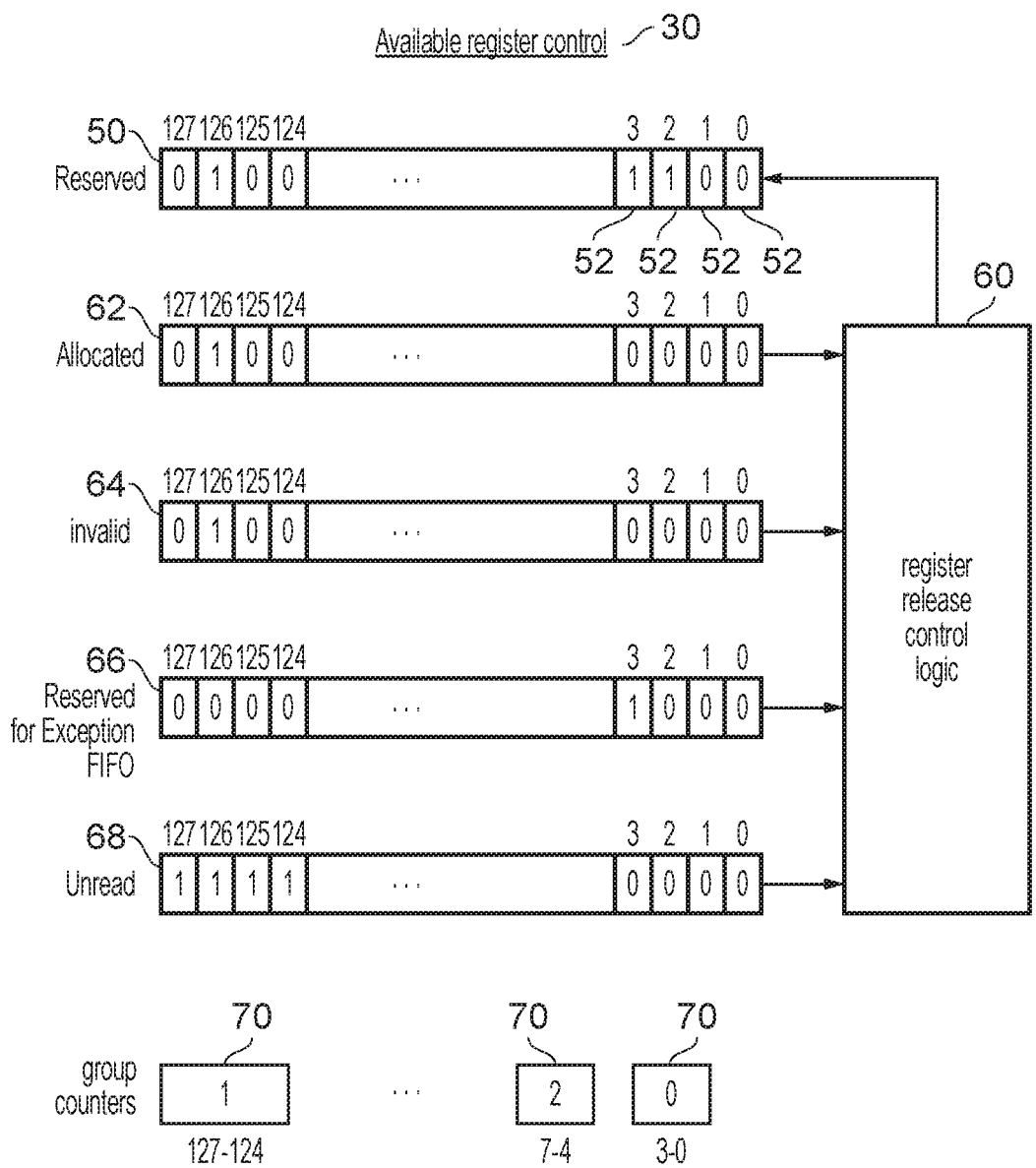
FIG. 2 shows an example of available register control circuitry for controlling which physical registers are available for renaming.

Entries may be removed from the exception memory 34 once the corresponding instruction has been resolved. When a speculative instruction is committed (i.e. it is known that the instruction should have executed and the result of the speculative instruction will be valid), then the corresponding entry can be removed from the exception memory 34 since it will no longer be required for restoring mapping in the rename table 32. Similarly, when a speculative instruction is cancelled, then once the rename table 32 has been updated based on the mapping indicated in the corresponding entry in the exception memory 34, then the corresponding entry can be removed. Whether a particular speculative instruction should be committed or cancelled will depend on an outcome of one or more earlier instructions, and this could be resolved either before or after the actual execution of the speculative instruction. The exception memory 34 may be managed as a first in, first out (FIFO) memory so that the entries are removed in the same order that they were allocated to the register. Hence, even if an instruction has already been committed or cancelled, its corresponding entry may not be removed from the exception FIFO 34 until any earlier instructions have been resolved, FIG. 2 shows a portion of the available register control circuitry 30. A reserved register 50 indicates which physical registers 20 are currently available for selection by the rename stage 8 or unavailable (reserved). The reserved register 50 includes a number of bitfields 52 each corresponding to one of the physical registers 20. When a bitfield has a value of 1 then the corresponding register is reserved and is not available for renaming, while if the bitfield for a particular register has a value of 0 then the register is available for renaming. When the rename stage 8 needs to generate a new register mapping, the reading stage 8 selects one of the physical registers 20 whose bitfield 52 in the reserved register 50 is equal to 0. Various techniques may be used to control which physical register is selected when there are multiple physical registers 20 available for renaming. For example, a random or round robin selection policy could be used.

When the rename stage 8 selects a physical register for renaming, the corresponding bit field 52 in the reserved register is set to 1 to indicate that the register is reserved. The physical register then remains unavailable for renaming until the corresponding bitfield 52 in the reserved register 50 is cleared. Register release control logic 60 controls when a particular register can be made available again, based on a number of status registers 62, 64, 66, 68. Each of the status registers 62, 64, 66, 68 corresponds to a particular condition which may prevent an allocated physical register from being released.

In this example the status registers include an allocated register 62 which indicates whether physical registers are currently allocated to an architectural register specifier in the rename table 32, an invalid register 64 which indicates whether registers are still to be written to by a pending instruction which has not yet completed at the write back stage 14 in the pipeline, an exception FIFO status register 66 which indicates whether physical registers are currently indicated in one of the entries of the exception FIFO 34, and an unread register 68 which indicates whether any registers could potentially be the subject of an outstanding read operation.

Each of the status registers includes a number of bit fields each corresponding to a respective physical register 20. When the bitfield for a given physical register is 1 in any of the status registers 62, 64, 66, 68 then the corresponding bitfield 52 of the reserved register 50 cannot be cleared to 0.

The register release control logic 60 clears a bitfield in the reserved register 50 if the corresponding bitfields in each of the status registers 62, 64, 66, 68 are all 0. For example a logical OR operation may combine the corresponding bitfields of registers 62, 64, 66, 68 by a logical OR operation and the corresponding bitfield 52 in the reserved register 50 may be cleared if the OR result is zero. Hence an allocated physical register can only be released to make it available for renaming again if it is not currently allocated in the rename table 32, there are no pending writes to that register as indicated by the invalid register 64, it is not currently indicated in the exception FIFO as indicated by the exception FIFO register 66, and there is no potential read outstanding to the register as indicated by the unread register 68.

The unread register 68 is associated with a number of register group counters 70 each corresponding to a group of physical registers 20. In the example of FIG. 2, each group comprises 4 registers so that one counter 70 is provided for registers 0 to 3, another counter is provided for registers 4 to 7, and so on. The count value of each counter 70 indicates how many of the pending register reads in the issue queue 10 specify one of the corresponding group of registers. The count value of a given counter 70 is zero if there are no pending reads to any of the corresponding group of registers. If the count value has a value of zero, then the bitfields in the unread register 68 for the corresponding group of registers are all set to 0 so that these registers could potentially be released for renaming, depending on the contents of the other status registers 62, 64, 66. If the count value has any value other than zero, then the bitfields in the unread register 68 for each registers of the corresponding group are set to 1 to prevent these registers being released for renaming. Hence, even if there is an outstanding read pending to only one of the registers in the group, this may still prevent all of the corresponding group of registers being released for renaming. Nevertheless, when the unread bits for a group of registers are set to 1, while this prevents a register which is already unavailable (i.e. it has a reserved bit of 1 in reserved register 50) being released, it does not prevent an available register within that group (a register with a reserved bit of 0 in reserved register 50) being selected for renaming.

For example, in FIG. 2 the physical register 126 is currently unavailable as indicated by the corresponding bitfield in the reserved register 50. The counter 70 for the group of registers 127-124 is 1, so there is a pending read to one of these registers outstanding in the issue queue 10. This means that the corresponding bit fields in the unread register 68 for registers 127-124 are net to 1. Therefore, physical register 126 cannot be reclaimed and made available for renaming until the corresponding bit in the unread register 68 is cleared, which will not happen until the group counter 70 for register group 127-124 becomes 0 again when the outstanding read has completed. Nevertheless, physical registers 124, 125 and 127 are still indicated as available in the reserved register 50 and so can be selected for renaming by the rename stage 8, but once selected would not be able to be released until the corresponding group counter 70 becomes zero again.

In contrast, for physical register 2 in the example of FIG. 2 the register is currently indicated as unavailable in the reserved register 50 but now the corresponding bit fields in each of the status registers 62, 64, 66, 68 are zero (since the corresponding group counter 70 for registers 3 to 0 is zero), and no the register release control logic 60 can release this register by clearing the bit field 52 for physical register 2 in the reserved register 50. On the other hand, even though the group counter 70 for registers 3 to 0 has a value of 0, physical register 3 is unavailable and cannot be released because it is still specified in the exception FIFO 34 as indicated by the corresponding bit in the exception FIFO status register 66.

Figure 3:
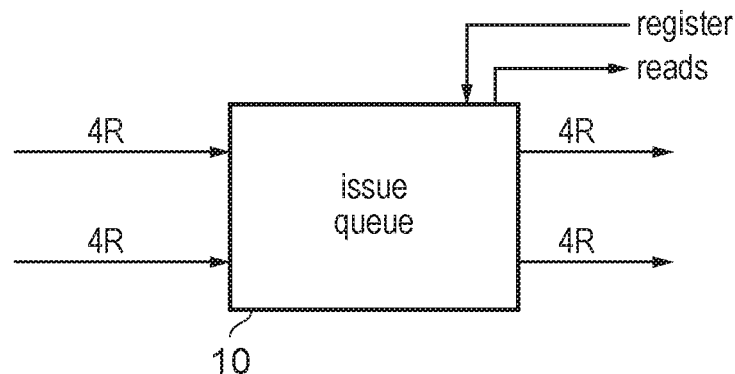
FIG. 3 shows an example of an issue queue for queuing instructions awaiting issuing for execution.
Figure 4:
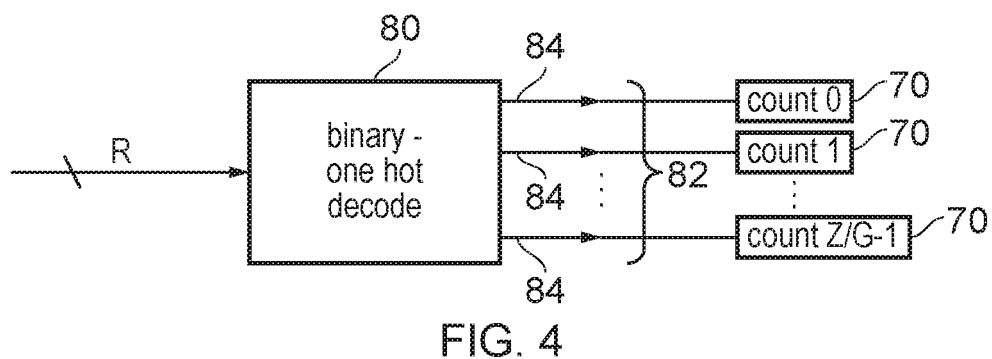
FIG. 4 shows an example of decode logic for decoding a physical register specifier to generate signals for incrementing or decrementing counters.

FIGS. 3 and 4 show examples of updating the group counters based on instructions being provided to, and removed from, the issue queue 10. As shown in FIG. 3, the issue queue 10 may receive a certain number of instructions per cycle, and a certain number of instructions per cycle may be issued to the execute unit 12. In FIG. 3, two instructions are received by the issue queue 10 per cycle and two instructions are issued to the execute unit per cycle, but other examples may have different numbers, and it will be appreciated that the number of instructions issued for execution per cycle does not necessarily need to be the same as the number of instructions provided to the issue queue per cycle. Each instruction may specify multiple registers to be read. For example, in FIG. 3, each instruction may contain up to 4 references to physical registers to be read, so that in each cycle up to 8 register references may be added to the issue queue and up to 8 register references may be removed from the issue queue. Each of these register references may be decoded in order to increment or decrement the corresponding group counters 70.

FIG. 4 shows an example of decode logic 80 for decoding a particular register reference. The decode logic 80 comprises binary-to-one hot decoding logic for decoding a register reference specified as a binary number into a one hot signal 82 comprising a group of bits 84, where at any one time only one of the bits 84 can be 1 and the other bits are 0. Which signal is set to 1 depends on the value of the binary register specifier. Each bit 84 of the one hot signal 82 corresponds to one of the group counters 70 and will be set to 1 if the binary register specifier R has a value corresponding to any of the registers in the corresponding register group. For example, if the registers are grouped into groups of 4 as in FIG. 2, the least significant bit 84 may be set if the register specifier R indicates one of registers 0 to 3, the next bit 84 may be set if the register specifier R indicates one of registers 4 to 7, and so on.

For each register reference entering the issue queue 10, the decode logic 80 is provided to convert the register reference into the one hot signal 82, and each group counter 70 is incremented in response to the corresponding bit 84 of the one hot signal 82. For each register reference leaving the issue queue, the decode logic 80 is provided to convert the register reference into the one hot signal 82, and each group counter 70 is decremented in response to the corresponding bit 84 of the one hot signal 82.

While the amount of decode logic 80 required will scale with the number of register references entering or leaving the issue queue 10 per cycle, this typically will require much less circuitry than if every register reference pending in the issue queue 10 was tracked. For example, if the issue queue 10 includes entries for 16 pending instructions, each of which may specify up to 4 registers, then this would require 64 register references to be decoded per cycle rather than the 16 register references as in the example of FIGS. 3 and 4.

The amount of decode logic 80 is also dependent on the number of counters 70 provided. Hence, the larger the number of registers in each group, the less decode logic 80 is required. By tracking the number of pending register reads in groups, rather than tracking the reads to each register individually, the complexity of the one hot decoding logic 80 can be reduced significantly, as well as requiring fewer counters 70 and less logic for reading the count value and controlling the corresponding bits of the unread register 68.

Figure 5:
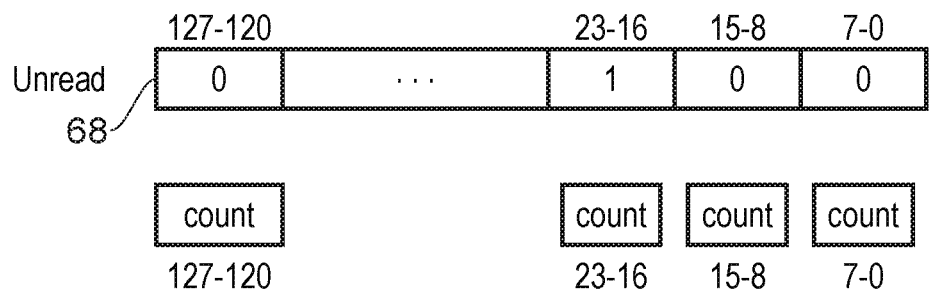
FIG. 5 shows another example for tracking physical registers which are still be read by pending instructions.

FIG. 5 shows an alternative example of the unread register 68. In this example, rather than having separate bit fields for each physical register 20, the unread register 68 may comprise a bitfield for each group of registers so that all of the registers within the same group are represented by a single bit which has a first value if there is at least one pending access to the corresponding group of registers and a second value if there is no pending access to any register of that group. The register release control control logic 60 can control whether the corresponding bitfields 52 in the reserved register 50 for each of the corresponding group of registers are cleared, based on the single bitfield in the unread register 68 for that group. Also in the example of FIG. 5, each group of registers comprises 8 registers rather than 4 as in FIG. 2.

More generally, if there are Z addressable physical registers 20 and a maximum of M pending register references in the issue queue 10 (corresponding to the number of registers specified per instruction multiplied by the maximum number of issue entries), then if the registers are grouped in groups of G registers (where G is 2 or more), then all the register references can be tracked using Z/G counters 70 of N bits, where N is the smallest integer greater than or equal to $\log_2(M \times G+1)$. In contrast, if register references were tracked for individual registers (i.e. G=1), then this would require Z counters of $\log_2(M+1)$ bits.

Applying this to a real example with an issue queue size of 16 entries, 4 read registers per instruction and 128 addressable physical registers, i.e. M=64, Z=128:

If each register was counted individually (G=1), then N=upper(log 2(65))=7 bits, and 128 counters of 7 bits each would requires a huge amount of decode logic 80 and other control circuitry.

In contrast, an acceptable less precise solution with G=8 may have N=upper(log 2(64*8+1))=10 bits and 128/8=16 counters. 16 counters of 10 bits each requires much less circuit area not only in reducing the number of counter bits (160 bits rather than 896 bits), but also in greatly reducing the corresponding decode logic.

In the extreme case where there is only one group (G=128), then N=upper(log 2(64*128+1))=14 bits, so there is only 1 counter of 14 bits which provides the smallest circuit area and leakage overhead for the particular example given above.

Hence, the group size G can be selected to trade off performance against power consumption and circuit area depending on the needs for a particular implementation.

In previous implementations, counting of individual registers has been considered too expensive for implementing in a practical system, so that other techniques for protecting physical registers still to be read against reallocation by the rename stage 8 have been used. For example, some techniques have prevented entries of the exception FIFO 34 being removed until the corresponding instruction has been executed (rather than being able to remove entries from the exception FIFO 34 when the instruction is committed, which may occur before actual execution of the instruction). However, blocking popping of entries from the exception FIFO 34 can result in the exception FIFO 34 becoming full earlier, which can result in additional stalls to the pipeline and harm performance. Instead, by counting the pending register reads in groups of registers, the control overhead of the counters 70 and decode logic 80 can be made less expensive so that it is not necessary to block the exception FIFO until reads are complete, providing a better balance between performance and power consumption.

FIGS. 6 to 12 show methods for tracking which registers are available for renaming. Each of these methods may be performed in parallel.

Figure 6:
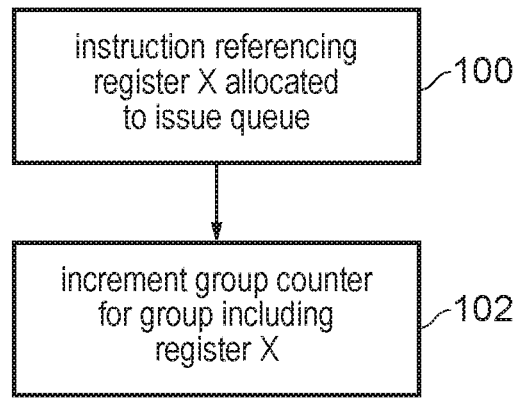
FIGS. 6 and 7 show a method of tracking pending references to a group of physical registers using a group counter.

FIG. 6 shows a method of incrementing the group counter 70 for a given register group. At step 100 an instruction referencing a particular register X is allocated to the issue queue 10. The decode logic 80 decodes the register reference and at step 102 triggers incrementing of the group counter 70 for the group of registers that includes register X.

Figure 7:
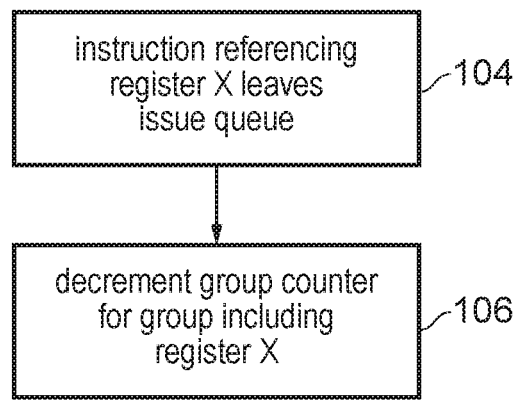

FIG. 7 shows a method of decrementing the group counter for a given register group. At step 104, an instruction referencing register X leaves the issue queue 10, indicating that the pending read to register X has completed. The decode logic 80 decodes the register reference and at step 106 triggers decrementing of the group counter 70 for the group of registers that includes register X.

Figure 8:
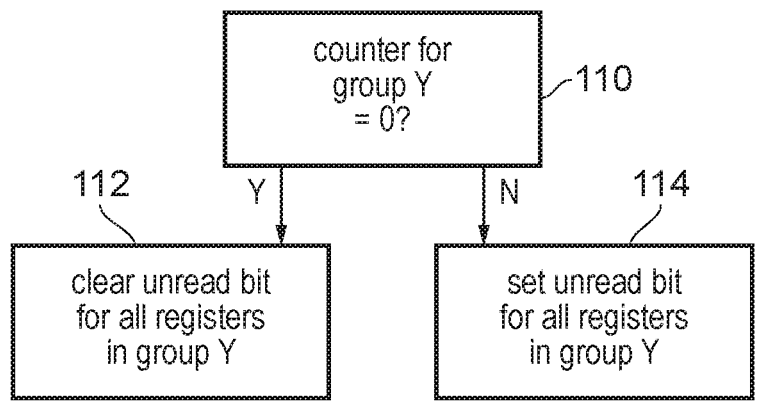
FIG. 8 shows a method of using the group counter to control whether the group of registers are available for renaming.

FIG. 8 shows a method of controlling the unread status register 68. At step 110 it is detected whether the group counter 70 for a register group Y is 0. If so, then at step 112 the unread bits are cleared (set to 0) for each of the physical registers in register group Y. If the group counter 70 is not 0, then at step 114 the unread bits are set (to 1) for each of the registers in register group Y. When the unread bits are set then this will prevent the corresponding registers becoming available for renaming if they are currently unavailable as indicated by the reserved register 50, but they will not prevent an already available register being selected by the rename stage 8.

Figure 9:
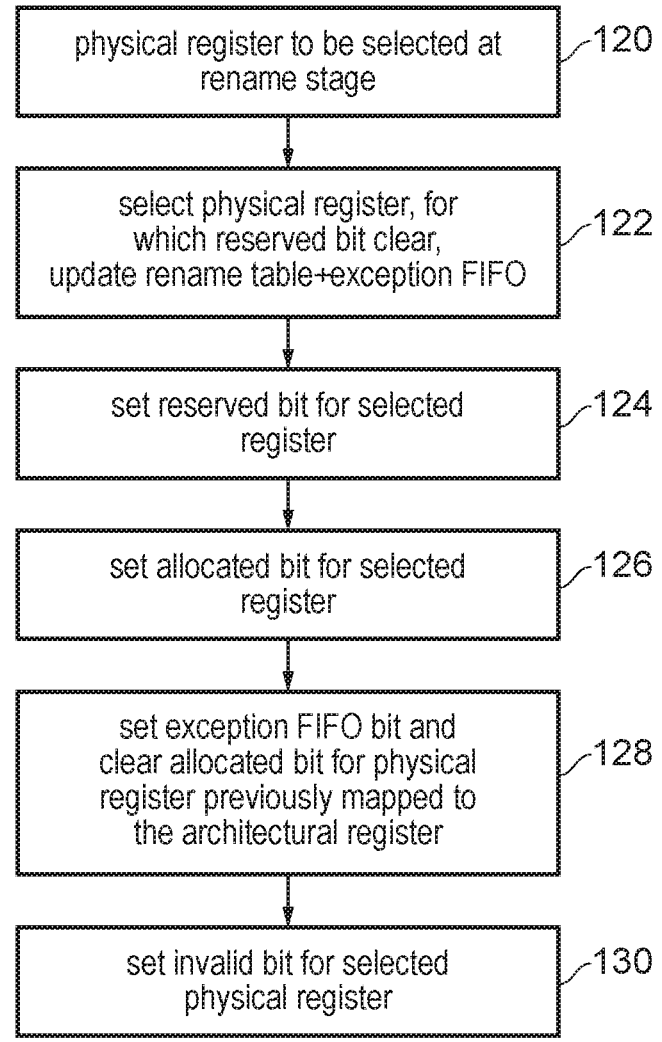
FIG. 9 shows a method of generating a new register mapping between an architectural register specifier and a physical register.

FIG. 9 shows a method of selecting physical registers for renaming at the rename stage 8. At step 120 the rename stage 8 encounters an instruction which specifies an architectural register specifier as a destination register, and so a physical register is to be selected for mapping to this architectural register specifier. At step 122, the rename stage 8 adds an entry to the exception FIFO 34 specifying the current mapping in the rename table 32 for the specified architectural register specifier, selects a physical register 20 for which the reserved bitfield 52 in the reserved register 50 is clear (=0), and updates the rename table 32 so that the specified architectural register specifier is now mapped to the selected physical register 20. At step 124, the reserved bit 52 in the reserved register 50 for the selected register is set to 1 to indicate that this register is now unavailable for renaming. At step 126, the allocated bit in the allocated register 62 corresponding to the selected physical register is set to 1. At step 128, the allocated bit in the allocated register 62 is cleared for the physical register which was previously mapped to the same architectural register, and the exception FIFO bit in exception FIFO register 66 is set for this register to indicate that this physical register is now indicated in the exception FIFO 34, not the rename table 32. At step 130 the invalid bit for the physical register selected at step 122 is set in the invalid register 64 to indicate that there is a pending write outstanding for this physical register.

Figure 10:
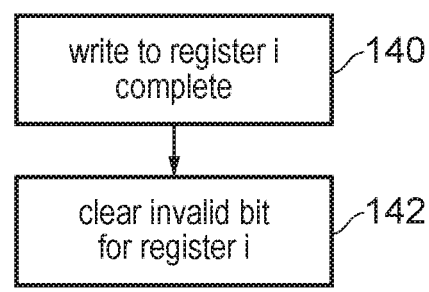
FIG. 10 shows a method of tracking completion of outstanding register writes.

FIG. 10 shows a method of controlling the invalid register 64. At step 140 a write to a physical register i is completed at the write back stage 14. At step 142, the invalid bit for register i is cleared in the invalid register 64. By keeping the invalid bit set until the write to register i is complete, this protects against write after write hazards.

Figure 11:
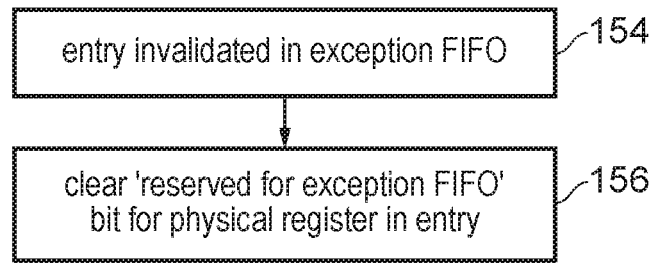
FIG. 11 shows a method of tracking which physical registers may still be required for restoring previous state following cancellation of a speculative instruction.

FIG. 11 shows a method of controlling the exception FIFO status register 66. At step 154 an entry is invalidated in the exception FIFO 34, which may take place once the corresponding speculative instruction is resolved (committed or cancelled). When the speculative instruction is committed, it is known that the physical register in the corresponding exception FIFO will no longer be required, since the register mapping indicated in the rename table 32 will now represent the valid contents of the specified architectural register. When the instruction is cancelled, after restoring the exception FIFO mapping to the rename table, the exception FIFO entry is no longer required. To track which instruction corresponds to which exception FIFO entry, the exception FIFO entries may be tagged with an indication of the corresponding instruction, or instructions in the pipeline 2 may be tagged with an indication of the corresponding exception FIFO entry. In response to an entry being invalidated in the exception FIFO 34 at step 154, at step 156 the bit of the exception FIFO status register 66 corresponding to the physical register specified in the invalidated entry is cleared to indicate that this physical register is no longer required by the exception FIFO 34.

Figure 12:
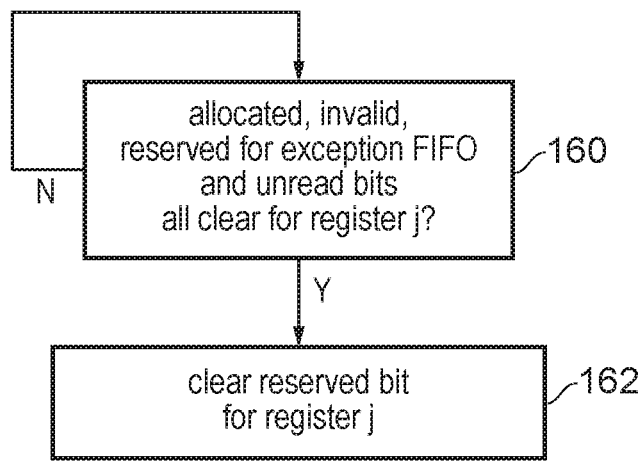
FIG. 12 shows a method of controlling which registers are available for renaming.

FIG. 12 shows a method of controlling releasing of previously allocated physical registers. At step 160, the register release control logic 60 determines whether the control bits for a particular register j are clear (=0) in each of the allocated register 62, the invalid register 64, the exception FIFO register 66 and the unread register 68. If not then the corresponding bit 52 in the reserved register 50 remains the same, so if the register j is already reserved, it will remain reserved. If all of the bits for register j are clear in the status registers 62, 64, 66, 68, then at step 162 register release control logic 60 clears the corresponding bit in reserved register 50 to indicate that this register can now be selected again by the rename stage 8. In this way, a register cannot be remapped to a different architectural register specifier until it is no longer required by a current mapping in the rename table 32, there are no outstanding writes to the register, there is no need for the register to be preserved in case a speculative instruction is cancelled, and there is no pending read to that register or any of the other registers within the same group.

While FIG. 2 shows an example in which reserved registers are indicated with bit field values of 1 and available registers are indicated with bit fields of 0, other examples could use the opposite mapping. In this case, the reserved register 50 could instead be interpreted as an "available register" where registers indicated with a bitfield of 1 are available and registers indicated with a bitfield of 0 are not available. The status registers 62, 64, 66, 68 could also use the opposite mapping with values of 0 indicating that registers should remain unavailable. In this case, the register release control logic 60 could comprise AND gates for combining each of the status bits for a given register using a logical AND operation, so that the availability bit is set to 1 only if each of the status registers 62, 64, 66, 68 indicate that the register can be made available.

Also, while FIG. 3 shows an example of counting the register references entering and leaving the issue queue 10, if another unit such as the execute unit 12 carries out register reads, then register references entering and leaving this unit could be counted in a similar way.

The information provided by the group counters 70 could in some examples be used for other purposes, in addition to controlling releasing of allocated registers for renaming. For example, they could be used to track the progress of certain instructions through the pipeline 2. For example, in an apparatus including more than one pipeline 2, the group counters 70 in one pipeline 2 may provide an indication of progress of instructions accessing a group of registers, which could be used by the other pipeline 2 to correlate its execution of instructions with that of the first pipeline 2. For example, some systems may have a data engine pipeline for executing one or more specific types of instructions, and a general purpose pipeline for executing other types of instructions, with the group counters 70 allowing some tracking of progress in the other pipeline.

Figure 13:
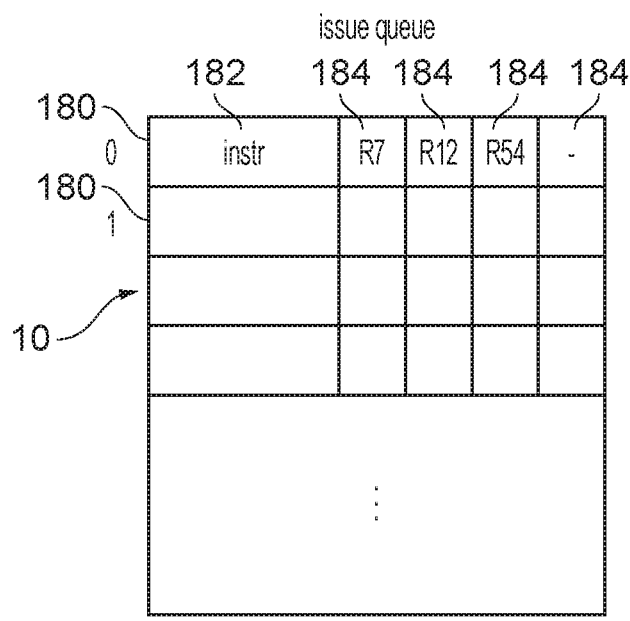
FIG. 13 shows an example of an issue queue with slots for pending instructions.

FIG. 13 shows an example of the issue queue 10 which comprises a number of issue slots 180 for holding indications of pending instructions awaiting issue. Each slot 180 comprises an indication (e.g. an opcode) 182 of the type of instruction, and zero, one or more register specifiers 184 identifying physical registers (renamed following the rename stage 8) which are to be read in response to the instruction. In the example of FIG. 13 each issue slot 180 may specify up to 4 physical register specifiers. The destination register of the instruction may also be specified, as well as any other control information associated with the instruction (these are not shown in FIG. 13 for conciseness).

Figure 14:
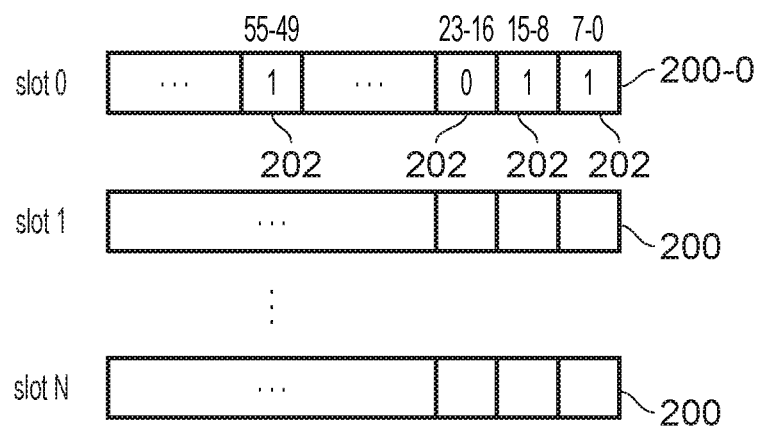
FIGS. 14 and 15 show other examples of tracking indications for tracking pending accesses to corresponding groups of registers.
Figure 15:
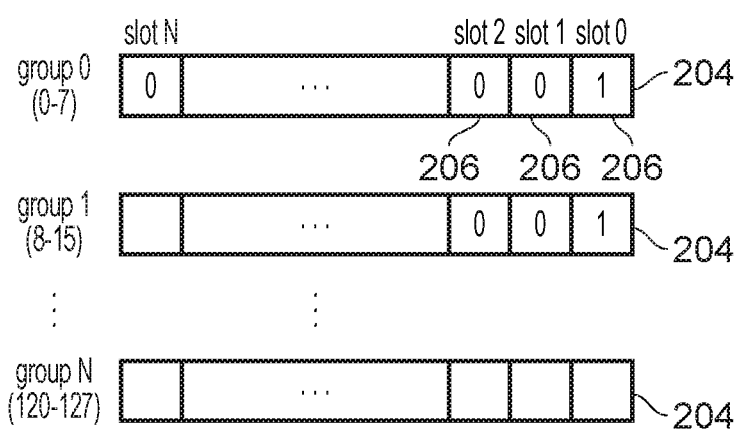

FIGS. 14 and 15 show further examples of group tracking indications provided by the available register control circuitry 30 for tracking pending register accesses in the issue queue 10 to any of a corresponding group of physical registers. These may be provided instead of the group counters 70, with registers 50, 62, 64, 66, 68 being used in a similar way to the examples discussed above.

In FIGS. 14 and 15, the group tracking indications indicate which issue slots 180 hold instructions requiring access to any register in the corresponding group of registers. In the example of FIG. 14, a number of issue slot status registers 200 are provided. Each issue slot status register 200 corresponds to one of the slots 180 of the issue queue and comprises a number of bitfields 202 with each bitfield 202 corresponding to a respective group of two or more physical registers. For instance, in this example each group comprises 8 registers no there is one bitfield 202 for registers 0 to 7, another bitfield for registers 8 to 15, and so on. Each bitfield 202 takes a first value (e.g. 1) if the instruction in the corresponding issue slot 180 refers to a register in the corresponding group of registers, and takes a second value (e.g. 0) otherwise. For example, in FIG. 13 the instruction in slot 0 specifies registers R7, R12, R54 and so the bitfields 202 in that slot's status register 200-0 for register groups 0-7, 8-15 and 49-55 are set to 1 and the other bitfields 202 in register 200-0 are set to 0. The available register control circuitry 30 may prevent a given register becoming available for renaming (i.e. prevent clearing of the corresponding bitfield in reserved status register 50) if any of the bitfields 202 corresponding to the group of registers including the given register are set to 1 in any of the slot status registers 200. While FIG. 14 shows an example where there is one slot status register 200 for each issue slot 180, in other examples there could be one status register 200 for each register reference specified in the issue queue. In practice, the amount of decoding logic may be similar since in order to determine the bitfields 202 for each slot 180, each of the register specifiers 184 in that slot may need to be decoded.

FIG. 15 shows another example in which each register group has a corresponding status register 204, and each status register 204 has a number of bitfields 206 each corresponding to one of the issue slots 180 to indicate whether the corresponding issue slot 180 contains a register reference to any register within the group corresponding to that status register 204. Unavailable registers within a particular group of registers can be made available if the bitfields 206 within the status register 204 corresponding to that group of registers are all set to 0 to indicate that there is no pending reference in any of the issue slots 206 to that group of registers. Note that the information shown in FIG.

15 is really the same information that is shown in FIG. 14, but with the bitfields 206 grouped by register group instead of by issue slot 180. Again, other examples could have bitfields 206 provided for each register specifier 184 in the issue queue rather than each issue slot 180.

Hence, the group tracking indications 200, 204 shown in FIG. 14 or 15 could be used to set or clear the corresponding bitfields of unread status register 68 shown in FIG. 2 or FIG. 5, and then the unread status register 68 could influence the clearing of the reserved status register 50 in a similar way to discussed above.

The counter 70 embodiment may be more efficient in many cases because only register references entering and leaving the issue queue need to be decoded as shown in FIG. 3, rather than requiring the references in each issue slot to be decoded. However, in examples with smaller issue queues 10 with fewer pending register references, the examples of FIGS. 14 and 15 may be preferred. In any case, the approach shown in FIGS. 14 and 15 may still require significantly less decoding logic than would be required if accesses to each individual register were tracked, rather than tracking accesses to groups of registers as shown in FIGS. 14 and 15. One reason is that when tracking registers in groups rather than individually, fewer bits of the register specifiers need to be considered in order to determine which tracking indication to update.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes and modifications can be effected therein by one skilled in the art without departing from the scope of the appended claims.

We claim:

1. A data processing apparatus comprising:
register rename circuitry configured to map architectural register specifiers specified by instructions to physical registers to be accessed in response to the instructions; and
available register control circuitry configured to control which physical registers are available for mapping to an architectural register specifier by the register rename circuitry;
wherein for at least one group of two or more physical registers, the available register control circuitry is configured to control whether the physical registers of said group are available in dependence on a group tracking indication indicative of whether there is at least one pending register read to any of the physical registers in said group;
wherein the group tracking indication comprises a group counter for counting a number of pending register reads to any of the physical registers in said group; and
a number of said group counters are provided each corresponding to a respective group of physical registers, where the number of group counters is less than a number of physical registers available for mapping to architectural register specifiers by the register rename circuitry;
wherein when the group tracking indication indicates that there is no pending register read to any of the physical registers in said group, the available register control circuitry is configured to determine whether an unavailable register of said group can become available independently from other registers of said group.

2. The data processing apparatus according to claim 1, wherein the available register control circuitry is configured to prevent an unavailable physical register becoming available when the group tracking indication for a group of physical registers including the unavailable physical register indicates that there is at least one pending register read to any of the physical registers in the group.

3. The data processing apparatus according to claim 1, wherein the group tracking indication comprises a group pending indication having one of a first value indicating that there is a pending register read to any of the physical registers in said group and a second value indicating that there is no pending register read to any of the physical registers in said group.

4. The data processing apparatus according to claim 1, comprising a register reading unit configured to read a value from a physical register in response to at least some instructions.

5. The data processing apparatus according to claim 4, wherein the register reading unit comprises an issue queue configured to queue instructions to be issued for execution.

6. The data processing apparatus according to claim 4, wherein the register reading unit comprises at least part of an execute unit configured to execute instructions.

7. The data processing apparatus according to claim 4, wherein the group tracking indication comprises a group counter indicative of the number of references to any of the physical registers in the group by pending instructions in the register reading unit.

8. The data processing apparatus according to claim 7, wherein the available register control circuitry is configured to increment the group counter in response to an instruction referencing any of the group of physical registers being provided to the register reading unit.

9. The data processing apparatus according to claim 7, wherein the available register control circuitry is configured to decrement the group counter in response to an instruction referencing any of the group of physical registers being removed from, or completing processing in, the register reading unit.

10. The data processing apparatus according to claim 7, wherein the available register control circuitry is configured to prevent an unavailable physical register becoming available when the group counter for a group of physical registers including the unavailable physical register has a value other than a predetermined value.

11. The data processing apparatus according to claim 10, wherein the predetermined value is zero.

12. The data processing apparatus according to claim 4, wherein the register reading unit comprises a plurality of register reading slots to store indications of pending register reads; and
the group tracking indication comprises an indication of which of the register reading slots store an indication of a pending register read specifying any of the physical registers in said group.

13. The data processing apparatus according to claim 1, comprising a plurality of group tracking indications each corresponding to a respective group of two or more physical registers;
    wherein for each group, the available register control circuitry is configured to control whether the physical registers of the group are available in dependence on the corresponding group tracking indications.

14. The data processing apparatus according to claim 7, wherein the apparatus comprises Z physical registers;
    each group of physical registers comprises G physical registers, where $2 \leq G \leq Z$;
    the register reading unit is capable of handling up to M pending register reads; and
    the apparatus comprises Z/G group counters, each group counter comprising at least N bits, where N is the smallest integer greater than or equal to $\log_2 (M \times G+1)$.

15. The data processing apparatus according to claim 1, wherein for each physical register of the group, the available register control circuitry is configured to control whether the physical register is available in dependence on the group tracking indication and at least one further parameter.

16. The data processing apparatus according to claim 15, wherein the at least one further parameter comprises one or more of:
    a parameter indicating whether the physical register is currently mapped to an architectural register specifier;
    a parameter indicating whether there is an uncompleted write to the physical register; and
    a parameter indicating whether there is an unresolved speculative instruction which specifies an architectural register specifier which was previously mapped to the physical register.

17. A data processing apparatus comprising:
    means for mapping architectural register specifiers specified by instructions to physical registers to be accessed in response to the instructions; and
    means for controlling which physical registers are available for mapping to an architectural register specifier by the means for mapping;
    wherein for at least one group of two or more physical registers, the means for controlling is configured to control whether the physical registers of said group are available in dependence on a group tracking indication indicative of whether there is at least one register read to any of the physical registers in said group;
    wherein the group tracking indication comprises a group counter for counting a number of pending register reads to any of the physical registers in said group; and
    a number of said group counters are provided each corresponding to a respective group of physical registers, where the number of group counters is less than a number of physical registers available for mapping to architectural register specifiers by the means for mapping;
    wherein when the group tracking indication indicates that there is no pending register read to any of the physical registers in said group, the means for controlling is configured to determine whether an unavailable register of said group can become available independently from other registers of said group.

18. A data processing method comprising:
    mapping architectural register specifiers specified by instructions to physical registers to be accessed in response to the instructions; and
    for at least one group of physical registers:
    maintaining a group tracking indication indicative of whether there is at least one register read to any of the physical registers in the group; and
    controlling, in dependence on said group tracking indication, whether the physical registers of the group are available for mapping to architectural register specifiers in the mapping step;
    wherein the group tracking indication comprises a group counter for counting a number of pending register reads to any of the physical registers in said group; and
    a number of said group counters are provided each corresponding to a respective group of physical registers, where the number of group counters is less than a number of physical registers available for mapping to architectural register specifiers; and
    wherein when the group tracking indication indicates that there is no pending register read to any of the physical registers in said group, the controlling comprises determining whether an unavailable register of said group can become available independently from other registers of said group.

* * * * *